US008831202B1

(12) United States Patent
Abidogun et al.

(10) Patent No.: US 8,831,202 B1
(45) Date of Patent: *Sep. 9, 2014

(54) FAILOVER MECHANISM BASED ON HISTORICAL USAGE DATA

(75) Inventors: Ayodeji Abidogun, Overland Park, KS (US); Badri P. Subramanyan, Overland Park, KS (US); William James Routt, Leawood, KS (US); John W. Davis, Kansas City, MO (US); Piyush Upadhyay, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 233 days.

This patent is subject to a terminal disclaimer.

(21) Appl. No.: 13/526,262

(22) Filed: Jun. 18, 2012

Related U.S. Application Data

(63) Continuation of application No. 12/358,734, filed on Jan. 23, 2009, now Pat. No. 8,243,911.

(51) Int. Cl.
*H04M 7/00* (2006.01)

(52) U.S. Cl.
USPC ............. 379/221.03; 379/221.04; 379/221.05

(58) Field of Classification Search
CPC ......... H04L 45/28; H04L 45/22; H04L 67/00; H04L 65/00; H04L 47/00
USPC ................. 379/221.03, 221.04, 221.05, 219, 379/221.01
See application file for complete search history.

(56) References Cited

U.S. PATENT DOCUMENTS 7,895,468 B2 * 2/2011 Kitamura et al. ............... 714/10

* cited by examiner

*Primary Examiner* — Thjuan K Addy

(57) ABSTRACT

Computer readable media and methods are provided for initiating a failover state in a network element. A failover is when the element's traffic is routed to a redundant element which takes over the functions of the element, and any session state information stored in the element is also transferred to the redundant element. If a failover occurs with an upstream element, a downstream element is not aware of the failover and does not transfer its session state information to its redundant element. By maintaining a database of historic usage information, the downstream element can determine that an upstream failover has occurred when the amount of data it is processing drops below a minimum usage threshold. The minimum usage threshold is based on the historical usage data and a relationship between a given time in the past and the current time.

14 Claims, 3 Drawing Sheets

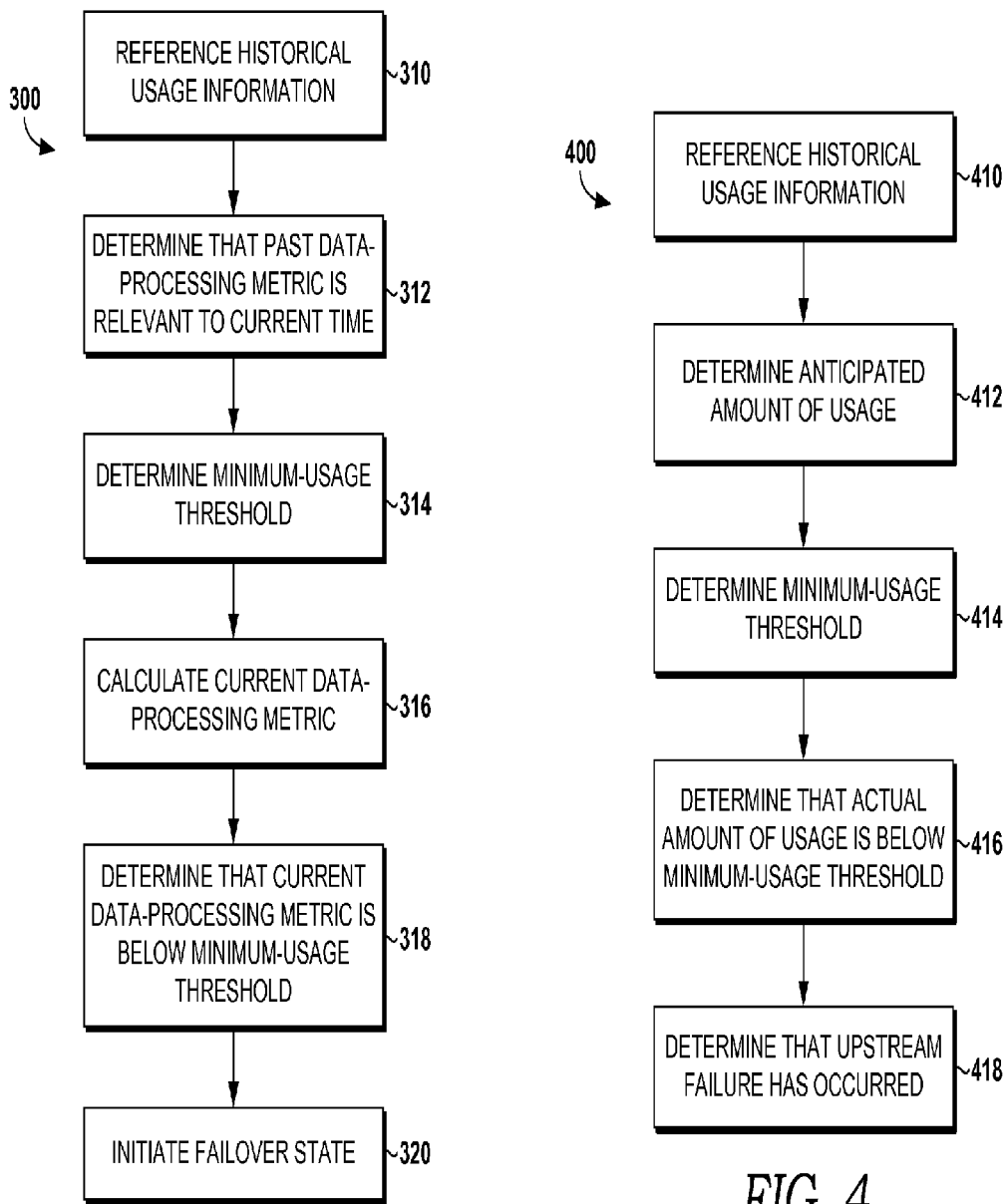

FAILOVER MECHANISM BASED ON HISTORICAL USAGE DATA

CROSS-REFERENCE TO RELATED APPLICATIONS

This application is a continuation of U.S. patent application Ser. No. 12/358,734, filed Jan. 23, 2009, entitled "Failover Mechanism Based On Historical Usage Data," which is herein incorporated by reference.

SUMMARY

Embodiments of the invention are defined by the claims below, not this summary. A high-level overview of embodiments of the invention is provided here for that reason, to provide an overview of the disclosure.

In one aspect, a set of computer-useable instructions provide a method of initiating a failover state of an element in a telecommunications network. An anticipated amount of usage for the network element at the present time is determined. Based on the anticipated amount of usage, a minimum-usage threshold is determined to be associated with said element for the present time, where the said minimum-usage threshold defines a minimum value of a data-processing metric, below which the network element would be deemed to be in a fail status. The data-processing metric is calculated based on current processing being handled by the network element. A determination is made that the data-processing metric is below the minimum-usage threshold, and the failover state of the network element is initiated based on the determination that the data-processing metric is below the minimum-usage threshold.

In a second aspect, a set of computer-useable instructions provide a method of determining when an upstream failure has occurred in a network. An anticipated amount of usage associated with a network element at a current time is determined. A minimum usage threshold to be associated with the network element at the current time based is determined on at least the anticipated amount of usage. Below the minimum usage threshold, the upstream failure would be deemed to have occurred. A low-usage determination that an actual amount of usage associated with the element at the current time is below the minimum usage threshold is provided, and a determination is made that the upstream failure has occurred based on the low-usage determination.

In a third aspect, a method is provided for initiating a failover state of an element in a telecommunications network. A minimum-usage threshold associated with the element for a current time is determined. The minimum-usage threshold defines a minimum value of a current data-processing metric, below which the element would be deemed to be in a fail status. A determination is provided that an actual amount of usage for the element at the current time is below the minimum-usage threshold. The failover state of the element is initiated based on the determination that the actual amount of usage for the element at the current time is below the minimum usage threshold.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 3 is a flowchart that depicts an illustrative method for initiating a failover state of an element in a telecommunications network in accordance with an embodiment of the present invention; and FIG. 4 is a flowchart that depicts an illustrative method for determining when an upstream failure has occurred in a network in accordance with an embodiment of the present invention.

DETAILED DESCRIPTION

Figure 1:
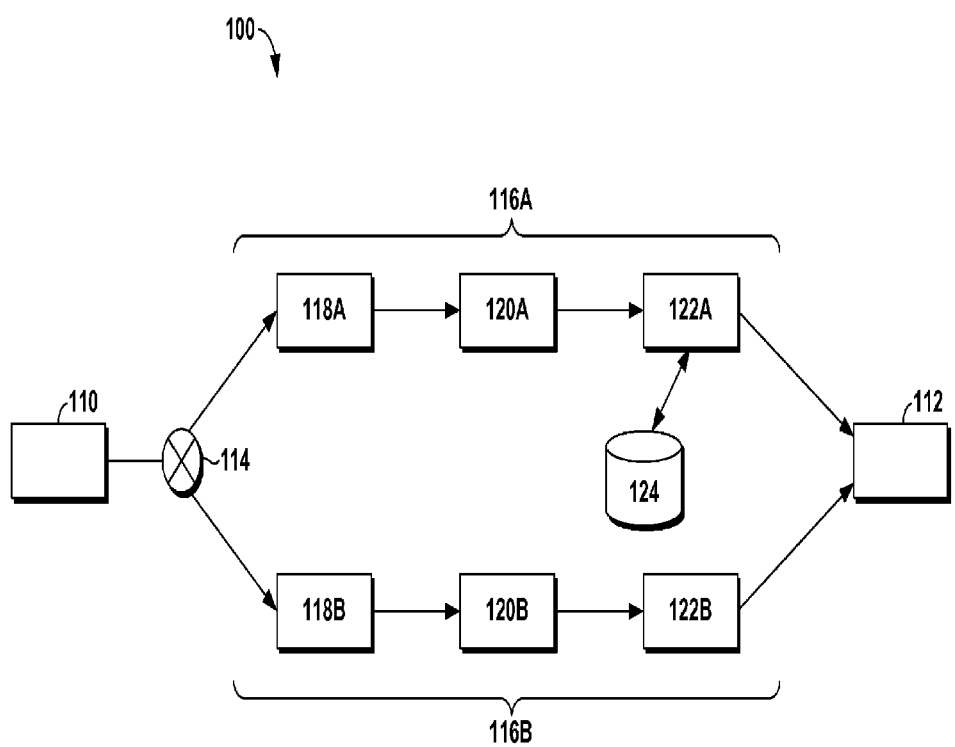
FIG. 1 is a block diagram that is illustrative of an exemplary system for initiating a failover state of an element in a telecommunications network in accordance with an embodiment of the present invention.

Embodiments of the present invention provide methods for determining when an upstream failure has occurred in a network and for initiating a failover state for an element in a network.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. Further, various technical terms are used throughout this description. An illustrative resource that fleshes out various aspects of these terms can be found in *Newton's Telecom Dictionary* by H. Newton, 24$^{th}$ Edition (2008).

In one embodiment, the present invention takes the form of a computer product that includes computer-useable instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

A network includes a number of interconnected network elements with traffic flowing along a stream of elements. The network has redundancy built into it so that when a network element fails there is another element, a redundant element, to take over. An element has monitoring scripts or other means of being monitored for failures or degradation of service. If the element is failing or is not able to provide service, it initiates a failover to the redundant element. A failover is when the element's traffic is routed to the redundant element, which takes over the functions of the element, and any session state information stored in the element is also transferred to the redundant element.

Often, a path within the network has a completely redundant path. A failure of a network element in the path could cause it to redirect its traffic to the redundant path, thus the downstream elements in the path would no longer receive the traffic from that element because the traffic would flow to downstream elements in the redundant path. A downstream element in the path would have no knowledge of that, because, for example, its monitoring scripts detect no problem with the downstream element itself. Because the downstream element does not know that the network traffic has been rerouted to the redundant path, network users may experience a degradation or interruption of service. This can occur even though the redundant path is being used, because the downstream element may possess session state information that is needed by its corresponding redundant element in the redundant path. Examples of session state information are cookies and authentication credentials. If the redundant element does not possess the session state information, a user's session may be terminated, or the user may be required to login again or reenter needed information.

By enabling the downstream network element to determine when an upstream failover has occurred, a failover can be initiated for the downstream element. The element will then transfer its data, including session state information, to its corresponding redundant element in the redundant path.

Turning now to FIG. 1, an exemplary system suitable for use in implementing embodiments of the present invention is shown and designated generally as a system 100. System 100 is but one example of a suitable system and is not intended to suggest any limitation as to scope of use or functionality. Neither should system 100 be interpreted as having any dependency or requirement relating to any one or combination of components or modules illustrated.

With continued reference to FIG. 1, a network client 110 communicates with a server 112. A router 114 routes the communication along a path 116A. Path 116A includes a network element 118A, a network element 120A and a gateway 122A. Gateway 122A is also a network element and maintains session state information associated with the data it processes. A path 116B is a redundant path for path 116A. Path 116B includes a network element 118B, a network element 120B and a gateway 122B. Network elements 118B, 120B and gateway 122B are redundant elements for network elements 118A, 120A and gateway 122A, respectively.

If a monitoring script of network element 118A detects a failure or problem with the element, it initiates a failover for the element. The traffic that was being processed by network element 118A is routed to network element 118B by router 114, and flows to network element 120B, to gateway 122B, and then to server 112. Thus, traffic continues to flow even though network element 118A is disabled.

Because gateway 122A maintains session state information, it needs to failover and transfer the session state information to gateway 122B so that no disruptions will occur in the associated sessions. However, gateway 122A has no direct knowledge that an upstream failover has occurred. Its monitoring scripts tell it that it is functioning correctly, and gateway 122A does not know that its network traffic has been routed to the redundant path.

Referring now to FIG. 3, an exemplary method suitable for use in implementing embodiments of the present invention is shown and designated generally as a method 300. Method 300 is but one example of a suitable method and is not intended to suggest any limitation as to scope of use or functionality. Neither should method 300 be interpreted as having any dependency or requirement relating to any one or combination of components or modules illustrated.

With continued reference to FIG. 3, at a step 310, gateway 122A references a dataset stored in a database 124 to access historical usage information that indicates an amount of data that gateway 122A has processed at various times in the past. Database 124 may be part of gateway 122A, or may be one or more devices or systems distinct from gateway 122A. The amount of data may include a number of users at a given time and/or a volume of data processed at a given time. Other measures of the amount of data known to one skilled in the art may also be used. The historical usage information may pertain to a specific instance in time, such as 7:15 pm, or a duration of time, such as 7:15 pm through 8:15 pm. Thus, the historical usage information provides associations between times in the past and usage. The usage information for a given time in the past provides a data-processing metric, a means for comparison with the current time, for the given time in the past.

At a step 312, a determination is made that the data-processing metric, the historical usage information, is relevant to a current time, based at least on a determination that a relationship exists between the given time in the past and the current time. For example, it might be determined that the amount of traffic exactly one week prior to the current time is statistically relevant to the amount of traffic that can be expected at the current time, based on a relationship between the same day of the week from one week to the next. As another example, it might be determined that the amount of traffic that occurred the previous year on a given holiday, such as Thanksgiving Day, is relevant to the amount of traffic that can be expected on Thanksgiving Day in the present year, based on a relationship between Thanksgiving holidays from one year to the next. Exemplary relationships between the given time in the past and the current time include, but are not limited to, time of day, day of week, day of month, holidays, and the size of the user base at the given time with respect to the present time.

Based on the data-processing metric and its relevance to the present time, a minimum-usage threshold for gateway 122A is determined for the present time at a step 314. The minimum-usage threshold indicates a minimum amount of data that is expected to be processed at the current time. Should the amount of data processed by gateway 122A fall below the minimum-usage threshold, the gateway 122 would be considered to be in a failed state.

At a step 316, a current data-processing metric is calculated that provides a measure of the amount of data being processed at the current time by gateway 122A. At a step 318, a determination is made that the current data-processing metric is below the minimum-usage threshold. The amount of data being processed by gateway 122A has dropped because the traffic has been routed through redundant path 106B, and gateway 122A's traffic is being processed by gateway 122B.

At a step 320, a failover is initiated for gateway 122A based on the determination that the current data-processing metric is below the minimum-usage threshold, such that data that was processed under the control of gateway 122A is directed to be processed under the control of gateway 122B. Gateway 122A communicates any session state information it is handling to gateway 122B, such that the session state information will be handled by gateway 122B.

Figure 2:
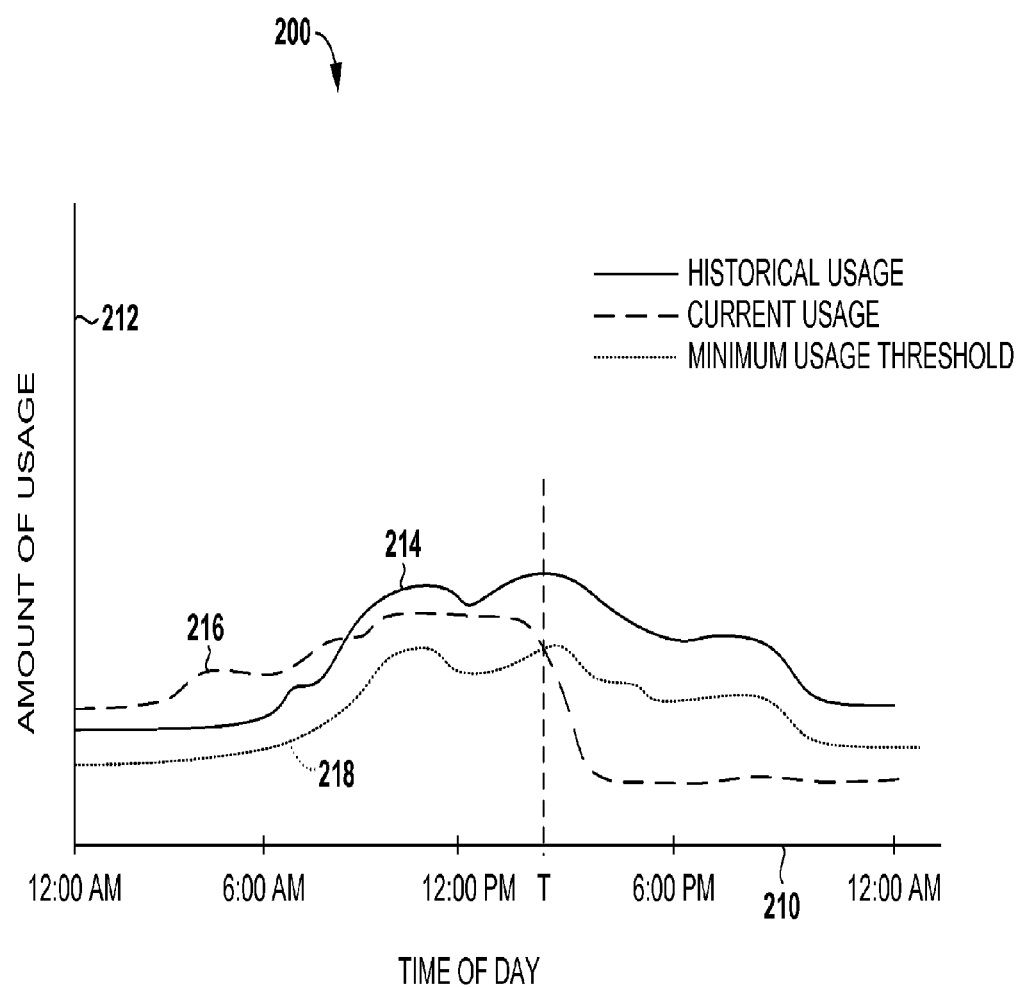
FIG. 2 is a graph that is illustrative of exemplary usage information associated with an element in a network in accordance with an embodiment of the present invention.

Referring now to FIG. 2, a graph illustrative of exemplary usage information associated with an element in a network in accordance with an embodiment of the present invention is shown and designated generally as a graph 200. Graph 200 is but one example of suitable usage information and is not intended to suggest any limitation as to scope of use or functionality. Neither should graph 200 be interpreted as having any dependency or requirement relating to any one or combination of components or modules illustrated.

With continued reference to FIG. 2, a horizontal axis represents a time of day 210. A vertical axis represents a measure of an amount of usage 212. A solid data line represents historical usage 214 as a function of time of day 210. A dashed data line represents an amount of current usage 216 as a function of time of day 210. A dotted data line represents a minimum usage threshold 218 as a function of time of day 210.

Historical usage 214 is a measure of usage at given times in the past for an element in a network. For example, historical usage 214 may represent an amount of usage at given times during the day, on a given day in the past. This provides a record of usage that may be recalled in order to compare past usage of the element with current usage.

Based on a relationship between a given time in the past and a current time, the usage for the given time in the past may be used to determine an expected amount of usage at the current time. For example, if it has been determined that the amount of usage during the course of one day tends to be the same as the amount of usage for the same day in the previous week, then one would expect the amount of usage on Tuesday of the present week to be similar to the amount of usage on Tuesday of the previous week. If Tuesday of the present week happens to fall on a holiday, then an additional determination may be used that relates usage for the holiday to usage for a non-holiday. Any condition affecting usage in relation to particular dates, holidays, and other events may be used to determine the relationship between usage at the given time in the past and the current time. Historical, statistical, and other types of analyses may also be used to determine the relationship.

Based on the expected amount of usage at the present time, minimum usage threshold 218 may be determined that indicates the least amount of usage that would be expected at the present time under normal conditions. Determination of minimum usage threshold 218 may also be based on the use of statistics or other mathematics, actual measurements of amounts of usage during normal and abnormal operating conditions, and other factors known to one of ordinary skill in the art. Minimum usage threshold 218 is determined such that an amount of usage below the threshold is considered an abnormal, or failed, state.

Referring again to FIG. 2, historical usage 214 as illustrated rises and falls throughout the day. Historical usage 214 is exemplary, and in other embodiments historical usage 214 may rise and fall at other times. Exemplary minimum usage threshold 218 tends to rise and fall when historical usage 214 does, but in other embodiments minimum usage threshold 218 may rise and fall differently.

Current usage 216 is determined for the current time, providing a measure that is compared with minimum usage threshold 218. In normal conditions, current usage 216 will be higher than minimum usage threshold 218. At a point in time T between 12:00 pm and 6:00 pm, current usage 216 falls below minimum usage threshold 218. At that point, the element initiates a failover event. Alternatively, the failover event may not be initiated until current usage 216 has remained below minimum usage threshold 218 for some specified period of time.

Referring now to FIG. 4, an exemplary method suitable for use in implementing embodiments of the present invention is shown and designated generally as a method 400. Method 400 is but one example of a suitable method and is not intended to suggest any limitation as to scope of use or functionality. Neither should method 400 be interpreted as having any dependency or requirement relating to any one or combination of components or modules illustrated.

With continued reference to FIG. 4, method 400 illustrates an exemplary method for determining when an upstream failure has occurred in a network. At a step 410, a dataset is referenced that stores historical usage information for an element in the network. The historical usage information indicates an amount of data processed by the element for given times in the past, and may be used as a measure, or metric, of the amount of data processing by the element at the given times in the past. The amount of data may include both a number of users having data processed by the element, and a volume of data processed by the element. The given times in the past may include both an instant in time and a duration of time. For example, 3:00 pm, Jul. 27, 2007, is an instant in time. An exemplary duration of time is 3:00 pm-4:00 pm, Jul. 27, 2007.

At a step 412, an anticipated amount of usage is determined for the network element at the current time based on the data processing-metric. A relationship between the data-processing metric and the current time is determined such that the data-processing metric is determined to be relevant to the current time. For example, it may be determined that data processing by the element increases to a certain level on the last Friday of every month. When the current time is the last Friday of the current month, the relationship with prior "last Fridays of months" may be used to determine the anticipated amount of usage at the current time. Any number of relevancy factors may be used to indicate a measure of relevancy. Exemplary relevancy factors are day of the week, time of day, day of the month, holidays, election days, the number of network subscribers at the current time with respect to a time in the past, sports seasons, and other factors influencing network usage that are known to one of ordinary skill in the art.

At a step 414, a minimum usage threshold is determined for the element at the current time. The minimum usage threshold is based at least on the anticipated amount of usage, and represents the least amount of data processing expected to occur in a normal situation for the element at the current time. An amount of data processing below the minimum usage threshold would be taken as an indication that an upstream failure had occurred in the network.

At a step 416, a low-usage determination is made that the actual amount of usage, or data processing, of the element at the current time is below the minimum usage threshold. The low-usage determination may be based on additional criteria, for example, it may depend on a specific duration of time that the actual amount of usage has been below the threshold.

At a step 418, a determination is made that an upstream failure has occurred, based on the low-usage determination. The element may take some action at this point, such as initiating a failover such that it transfers control of any data it would normally handle to a backup network element associated with it. This includes transferring session state information to the backup element.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art upon reading this disclosure that do not depart from its scope.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-useable instructions embodied thereon for performing a method of initiating a failover state of an element in a telecommunications network, the method comprising:
   determining an anticipated amount of usage for the network element at a present time;
   based on said anticipated amount of usage, determining a minimum-usage threshold to be associated with said element for said present time, wherein said minimum-usage threshold defines a minimum value of a data-processing metric, below which said network element would be deemed to be in a fail status;
   calculating said data-processing metric based on current processing being handled by said network element;
   determining that said data-processing metric is below said minimum-usage threshold; and
   initiating said failover state of said network element based on said determining that said data-processing metric is below said minimum-usage threshold.

2. The media of claim 1, wherein said anticipated amount of usage comprises one of a number of users and a volume of data.

3. The media of claim 1, wherein said initiating includes directing control over data that was previously being handled by said network element to a second network element.

4. The media of claim 3, wherein said data that was previously being handled by said network element comprises session state data.

5. One or more nontransitory computer-readable media having computer-useable instructions embodied thereon for determining when an upstream failure has occurred in a network, the method comprising:
   determining an anticipated amount of usage associated with a network element at a current time;
   determining a minimum usage threshold to be associated with said network element at said current time based on at least said anticipated amount of usage, below which minimum usage threshold said upstream failure would be deemed to have occurred;
   providing a low-usage determination that an actual amount of usage associated with said network element at said current time is below said minimum usage threshold, and
   determining that said upstream failure has occurred based on said low-usage determination.

6. The media of claim 5, wherein said amount of usage comprises one of a number of users and a volume of data.

7. The media of claim 5, wherein determining said anticipated amount of usage is further based on said one or more relevancy factors that indicate a measure of a relevancy of said data-processing metric to said current time.

8. The media of claim 7, wherein said one or more relevancy factors comprise one of time of day, day of week, day of month, a holiday, and size of a user base.

9. A method for initiating a failover state of an element in a telecommunications network, the method comprising:
   determining a minimum-usage threshold associated with said element for a current time, wherein said minimum-usage threshold defines a minimum value of a current data-processing metric, below which said element would be deemed to be in a fail status;
   providing a determination that an actual amount of usage for said element at said current time is below said minimum-usage threshold; and
   initiating said failover state of said element based on said determination that said actual amount of usage for said element at said current time is below said minimum usage threshold.

10. The method of claim 9, wherein said current data-processing metric is based on at least one of a number of users and a volume of data.

11. The method of claim 9, wherein said initiating includes directing control over data that was previously being handled by said element to a second element.

12. The method of claim 9, further comprising determining a relevance of said data-processing measures to said current time.

13. The method of claim 12, wherein determining a minimum-usage threshold is further based on the relevance of said data-processing measures to said current time.

14. The method of claim 13, wherein said relevance of said data-processing measures to said current time is based on at least one of time of day, day of week, day of month, a holiday, and size of a user base.

* * * * *